Oct. 23, 1962 H. POMERNACKI 3,059,317
SPIROID HOB
Filed July 7, 1959 2 Sheets-Sheet 1

INVENTOR.
Henry Pomernacki
By: Olson & Tresher attys.

Oct. 23, 1962  H. POMERNACKI  3,059,317
SPIROID HOB
Filed July 7, 1959  2 Sheets-Sheet 2
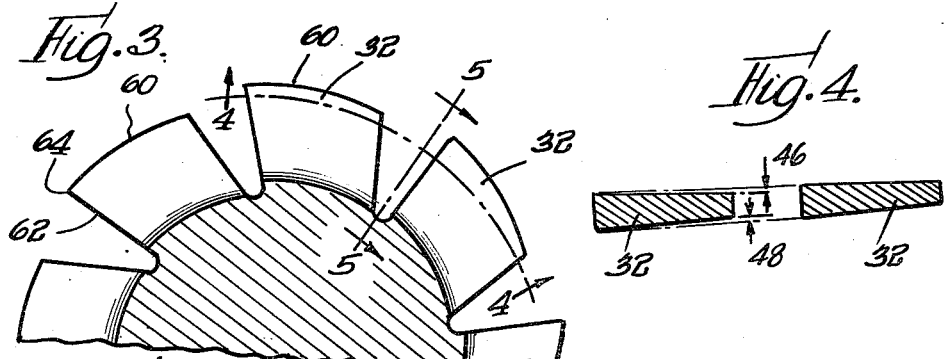
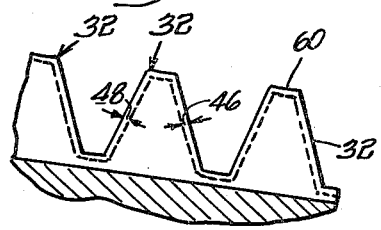
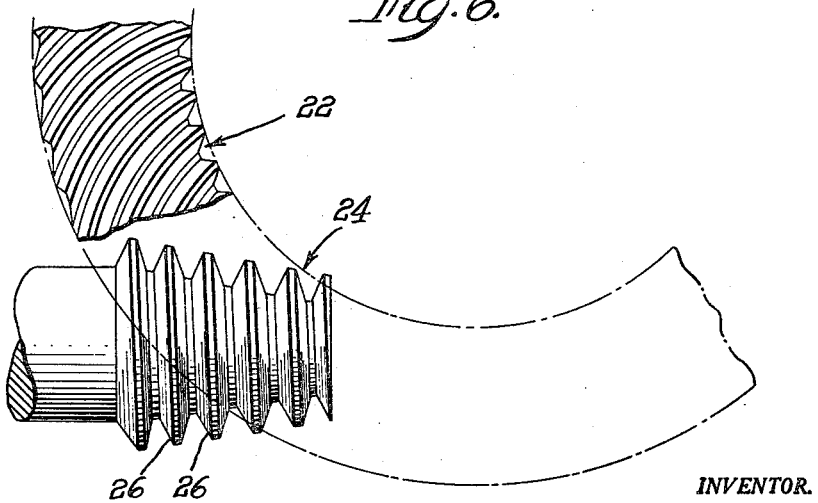
INVENTOR.
Henry Pomernacki
By: Olson & Trexler att.

United States Patent Office 3,059,317
Patented Oct. 23, 1962

3,059,317
SPIROID HOB
Henry Pomernacki, Chicago, Ill., assignor to Illinois Tool Works Inc., a corporation of Delaware
Filed July 7, 1959, Ser. No. 825,508
4 Claims. (Cl. 29—103)

The present invention relates to speed reduction gearing and more particularly to hobs for cutting gears of the type disclosed in U.S. Patents Nos. 2,696,125 and 2,731,886, issued December 7, 1954 and January 24, 1956, to Oliver E. Saari. Such gearing comprises an annular gear which meshes with a worm gear having a straight taper and one or more worm threads of uniform lead. As disclosed in the above-mentioned patents, the tapered worm and the coacting gear have an askew relationship to each other which provides extremely worth-while advantages.

The thread of the tapered worm which meshes with a gear in gearing of the character referred to has unequal pressure angles. Accordingly, the hob used to cut such a gear has unequal pressure angles corresponding to the unequal pressure angles of the worm thread.

One object of the invention is to provide for cutting a gear for use in gearing of the above character an improved gear hob which has increased cutting ability and efficiency and a materially extended service life.

Another object is to provide a tapered gear hob having hob teeth of unequal pressure angles which are relieved in an improved manner which provides equal side clearance on opposite sides of the teeth to the end that the cutting efficiency and ability of the hob are greatly improved and its effective life as a tool materially extended.

Another object is to provide an improved hob having teeth of unequal pressure angles which are form relieved in a direction which generally bisects the combined pressure angles of the teeth to provide an improved and more efficient balance between the side clearances on opposite sides of the hob teeth.

A further object is to provide an improved hob formed in an improved manner which enables the hob to produce an improved gear of the above-described character which, by virtue of features provided in the gear by use of the improved hob, will assure a proper seating and mating of the gear with a tapered worm after an initial "run-in-period" of the gear and worm working together.

Another object is to form a hob of the above character in a new and improved manner which enables the hob to cut, for meshing with a tapered worm, an improved gear having features which assure a proper seating and mating of the gear with a tapered worm after an initial "run-in-period" of the gear and worm working together.

Another object is to provide for meshing with a tapered worm, an annular gear which is improved by crowning in a manner which provides extended "wear-in" surfaces on the gear which are worn away after an initial "run-in-period" with a coacting tapered worm to assure proper seating and mating of the gear with the worm.

Other objects and advantages will become apparent from the following description of the invention taken in relation to the accompanying drawings, in which:

FIG. 3 is a transverse sectional view of the hob taken generally with reference to the line 3—3 of FIG. 1;

FIG. 4 is a transverse sectional view of the hob teeth taken with reference to the arcuate section line 4—4 of FIG. 3 and illustrating the equal side clearance on opposite sides of the hob teeth;

FIG. 5 is a fragmentary sectional view of the hob taken generally along the line 5—5 of FIG. 3; and FIG. 6 is a fragmentary elevational view showing an annular gear manufactured by the improved hob, meshing with a standard worm.

Figure 1:
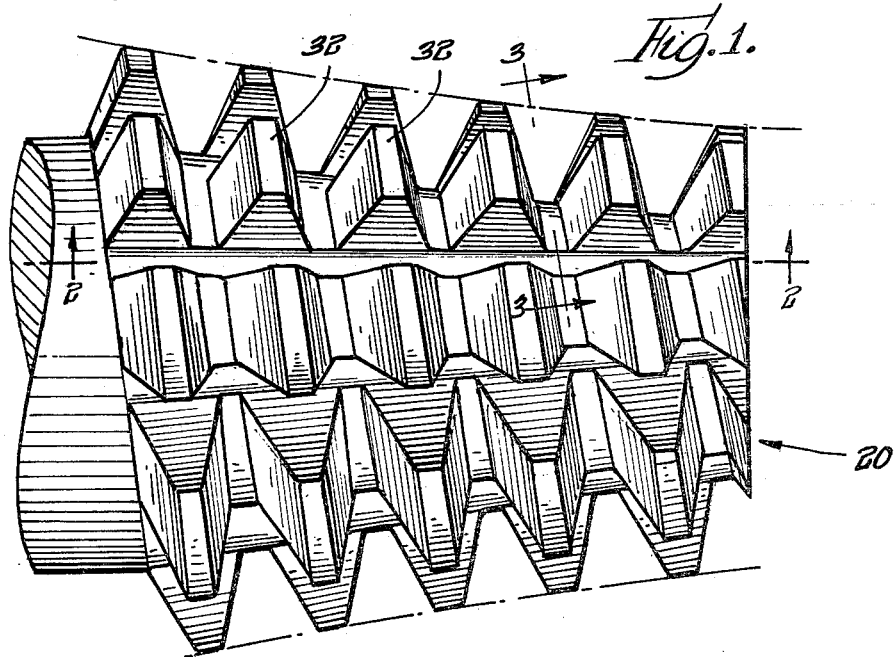
FIGURE 1 is a side elevational view of an improved hob fashioned in accordance with the invention.

Referring to the drawings in greater detail, the tapered hob 20 illustrated in FIG. 1 and forming an exemplary embodiment of the invention is adapted to be used in a conventional manner to cut an annular gear 22 which meshes, as shown in FIG. 6, with a worm 24 having a straight taper and having an askew positional relationship to the gear. The gear 22 and the coacting worm 24 form speed reduction gearing of the type disclosed in the previously mentioned U.S. Patents Nos. 2,696,125 and 2,731,886. As will presently appear, the gear 22 as cut by the improved hob 20 has an improved form which assures a proper seating and mating of the gear with the worm 24 after an initial "run-in-period."

While reference may be made to the above mentioned patents for a detailed disclosure of speed reduction gearing of the type illustrated in FIG. 6, it is noteworthy that the worm 24 has one or more threads 26 which have a uniform or unvarying lead along the worm. Each thread 26 has two pressure angles which are materially different from each other, as will presently appear in connection with the description of the improved hob 20 provided for cutting the gear 22. Thus, the worm 24 is characterized by its straight taper, the uniform or unvarying lead of the thread or threads on the worm, and the unequal pressure angles of each thread.

For purposes of discussion, it will be assumed that the hob 20 illustrated in FIG. 1 is designed to cut a gear 22 adapted to mesh with a worm 24 having a single thread. However, the principles of this invention are equally applicable to hobs and gearing adapted for usage of a worm having a plurality of threads.

Figure 2:
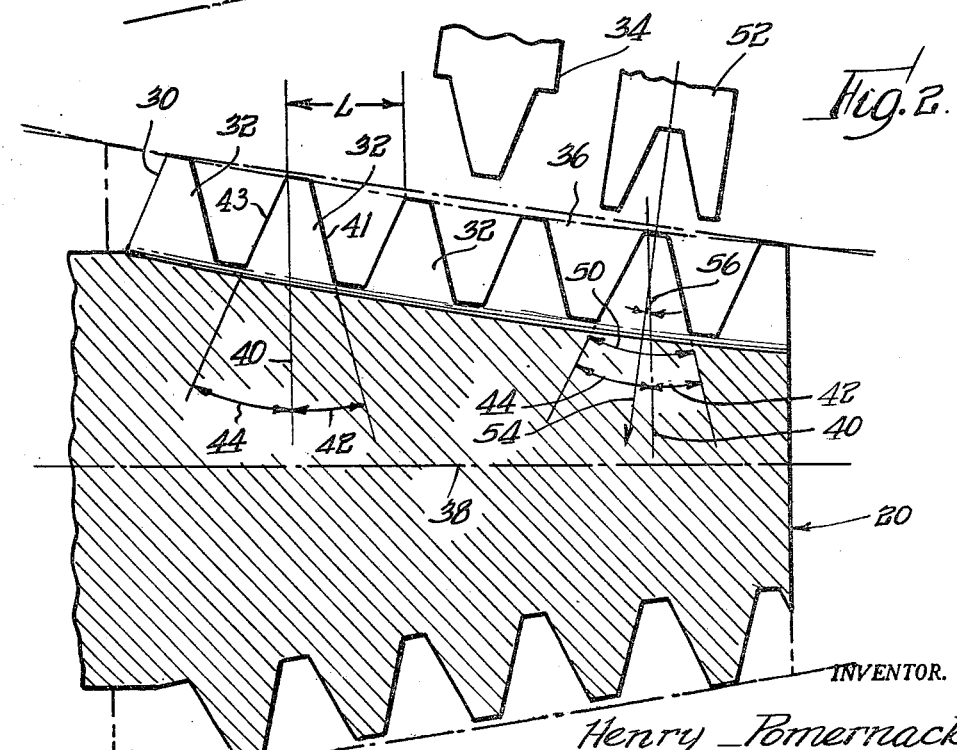
FIG. 2 is a longitudinal sectional view of the hob taken through the center of the hob with reference to the line 2—2 in FIG. 1 and illustrating the manner in which cutting tools are worked in relation to the hob in manufacturing the hob.

The improved hob 20 is formed from a tapered hob blank 28 illustrated in phantom in FIG. 2 and having the general shape of a truncated cone. A worm 30 for forming hob teeth 32 is formed on the hob blank 28 by a suitable worm cutting tool 34, which is illustrated schematically in FIG. 2 in a position radially spaced from the hob 20. The hob teeth 32, as shown in FIG. 2, represent transverse sections of the worm 30 cut by the tool 34.

Significant features of the improved hob 20 may be described to advantage with reference to the generation of the worm 30 which is interrupted to form the hob teeth 32.

To form the worm 30 the hob blank 28 is rotated about its axis 38 relative to the worm cutting tool 34, which is advanced into engagement with the blank and moved relative to the blank along a curved path which conforms to the line 36 shown in phantom in FIG. 2. The path of the cutting tool 34, as represented by the line 36, extends longitudinally along the hob blank at a small angle relative to the axis 38 of the hob blank and is slightly curved inwardly, as shown, to have a curvature along the length of the hob which is somewhat convex toward the hob axis. While more than one tool may be used to cut the worm 30 from which the hob teeth are formed, the individual tools are moved along a curved path relative to the hob blank, as indicated by the line 36, as the hob blank is rotated relative to the tool.

The hob blank with the worm 30 cut in this manner has a tapered overall shape that is slightly modified to have a curvature between opposite ends of the hob which is convex toward the axis of the hob as viewed in longitudinal section.

The worm 30 cut on the hob body as described is interrupted in a well known manner to form the hob teeth 32. The hob teeth thus formed constitute sections of a uniform worm, and hence are of uniform shape and size in transverse section.

The series of hob teeth 32 formed by interrupting the worm 30 extend around the hob and along the hob for a substantial distance and has a lead, indicated by the letter "L" in FIG. 2, which is uniform along the length of the hob. The angles which the cutting edges 41 and 43 on opposite sides of each hob tooth 32 make with a perpendicular 40, FIG. 2, from the hob axis 38 are the pressure angles of the hob teeth. These correspond to the pressure angles of the threads 26 of the worm 24 which meshes with the gear 22 as shown in FIG. 8. The two pressure angles of a hob tooth 32 are identified in FIG. 2 by the numerals 42 and 44, the pressure angle 42 of the side of the tooth facing the small end of the hob being substantially smaller than the other pressure angle 44.

The individual hob teeth 32 are form relieved in a manner which provides substantially equal side clearances 46, 48 on opposite sides of the hob teeth as indicated in FIGS. 4 and 5.

The generally uniform or balanced side clearances on opposite sides of the hob teeth 32 are provided by form relieving the individual hob teeth in a direction which substantially bisects the combined pressure angles of the individual hob teeth. The direction in which the hob teeth are form relieved to provide substantially equal side clearances on opposite sides of the teeth may be visualized with reference to FIG. 2. In this figure the combined pressure angles 42, 44 of an individual hob tooth are designated by the number 50. The hob teeth are form relieved by means of a suitable relieving tool illustrated schematically in FIG. 2 in a position radially spaced from the hob and identified by the reference numeral 52. While the hob 20 being formed is rotated relative to the form relieving tool 52 and the tool is being progressed along the hob, as will be understood by those in the art, the form relieving tool is advanced toward the hob axis 38 in a direction, indicated by the arrow 54, which substantially bisects the combined pressure angles 50 of the individual hob teeth. Put another way, the desired form relief on the individual gear teeth is provided by moving the relieving tool 52 in a direction which is inclined at an angle relative to a perpendicular 40 from the hob axis 38 that is equal to one-half the difference of the two pressure angles 42 and 44. This angle at which the direction of the relieving tool movement is inclined relative to the perpendicular 40 is designated by the numeral 56 in FIG. 2.

As will be presently discussed in further detail, form relieving the hob teeth 32 to provide equal side clearances 46, 48 in the manner described greatly increases the cutting ability and tool life of the hob as it is subsequently used to cut gears typified by the gear 22 illustrated in FIG. 6.

The hob 20 formed in the improved manner described, not only has an increased cutting ability and an extended service life, but it also serves by virtue of its improved character to cut an improved gear 22, FIG. 6, which, itself, is improved by the cutting action of the improved hob in forming the gear.

The hob 20 is used to cut gears in a conventional manner well known in the art, which requires no description here. The cutting ability and efficiency of hobs formed in the manner described is greatly improved, as previously mentioned, in relation to the corresponding capabilities of conventional hobs used for the same purpose. Also, the tool life of the hobs is materially increased as recited.

The gear 22 shown in FIG. 6 is illustrative of gears cut by the hob 20. The gear 22 has an improved form by virtue of the cutting action of the improved hob 20, which provides superior seating and mating of the gear with the coacting worm 24.

The invention is claimed as follows:

1. A hob for cutting a gear adapted to mesh with a worm having a straight taper, said hob comprising a tapered hob body defining and including a series of hob teeth extending around the hob body and along the body for a substantial distance, said hob teeth having a uniform shape and size in transverse section; said hob body including said teeth having the over-all form of a truncated cone modified to have a slight curvature which, as viewed in longitudinal section, is convex toward the axis of the hob; each of said hob teeth defining two cutting edges located on opposite sides of the tooth and having unequal pressure angles measured with reference to a plane perpendicular to the axis of the hob, and said hob teeth being relieved in a direction which substantially bisects the combined pressure angles of the individual teeth to provide approximately equal side clearances on opposite sides of the teeth.

2. A hob comprising a hob body defining and including a series of hob teeth extending around the body and extending a substantial distance therealong, the effective cutting portions of said hob teeth having a uniform shape and size in transverse section; said hob body including said teeth having the over-all form of a truncated cone modified to have a slight curvature which, as viewed in longitudinal section, is convex toward the axis of the hob; each hob tooth defining on opposite sides thereof cutting edges having unequal pressure angles measured with reference to a plane perpendicular to the axis of the hob; and said hob teeth each being relieved in a direction which is canted, with reference to a plan extending through the tip of the tooth perpendicularly to the axis of the hob, positively inwardly toward the high pressure angle side of the tooth at an angle which is substantial relative to the difference between the pressure angles of the cutting edges on opposite sides of the tooth and which causes the canting of the direction of tooth relief to effect a substantial increase in the side clearance on the low pressure angle side of the tooth and a substantial decrease in the side clearance on the high pressure angle side of the tooth.

3. A gear cutting hob comprising a hob body defining and including a series of hob teeth extending around the hob body and along the hob body; the tips of all said hob teeth being flush with an imaginary surface of revolution having the form of a truncated cone modified to have a slight degree of curvature which, as viewed in longitudinal section, is convex toward the axis of the hob; each hob tooth defining cutting edges located on opposite sides of the tooth and having unequal pressure angles measured with reference to a line perpendicular to the axis of the hob; and each of said hob teeth being relieved in a direction which is canted, with reference to a plane extending through the tip of the tooth perpendicularly to the axis of the hob, inwardly toward the high pressure angle side of the tooth at an angle which is equal to approximately one-half of the difference between the pressure angles of the cutting edges on opposite sides of the tooth.

4. A hob comprising a hob body defining and including a series of hob teeth extending around the body and extending a substantial distance therealong, the effective cutting portions of said hob teeth having a uniform shape and size in tranverse section, said hob body including said teeth having the over-all form of a truncated cone, each hob tooth defining on opposite sides thereof cutting edges having unequal pressure angles measured with reference to a plane perpendicular to the axis of the hob; and each of said hob teeth being relieved in a direction which is canted, with reference to a plane extending through the tip of the tooth perpendicularly to the axis of the hob, positively inwardly toward the high pressure angle side of the tooth at an angle which is substantial relative to the difference between the pressure angles of the cutting edges on opposite sides of the tooth and which causes the canting of the direction of tooth relief to effect a substantial increase in the side clearance on the low pressure angle side of the tooth and a substantial decrease in the side clearance on the high pressure angle side of the tooth.

References Cited in the file of this patent

UNITED STATES PATENTS

| | | |
|---|---|---|
| 1,734,558 | Brussel | Nov. 5, 1929 |
| 1,780,805 | Wheatley | Nov. 4, 1930 |
| 1,882,008 | Head | Oct. 11, 1932 |
| 2,146,232 | Schicht | Feb. 7, 1939 |
| 2,338,366 | Trbojevich | Jan. 4, 1944 |

UNITED STATES PATENT OFFICE
CERTIFICATE OF CORRECTION

Patent No. 3,059,317     October 23, 1962

Henry Pomernacki

It is hereby certified that error appears in the above numbered patent requiring correction and that the said Letters Patent should read as corrected below.

In the drawings, Sheets 1 and 2, and in the heading to the printed specification, line 2, title of invention, for "SPIROID HOB", each occurrence, read -- HOB --; column 4, line 31, for "plan" read -- plane --.

Signed and sealed this 23rd day of April 1963.

(SEAL)
Attest:

ERNEST W. SWIDER
Attesting Officer

DAVID L. LADD
Commissioner of Patents